(12) United States Patent
Assam

(10) Patent No.: US 9,135,291 B2
(45) Date of Patent: Sep. 15, 2015

(54) SYSTEM AND METHOD FOR DETERMINING SIMILARITIES BETWEEN ONLINE ENTITIES

(71) Applicant: Megathread LLC, Lafayette, CO (US)

(72) Inventor: Brian Assam, Sioux Falls, ND (US)

(73) Assignee: Megathread, Ltd., Sioux Falls, SD (US)

( * ) Notice: Subject to any disclaimer, the term of this patent is extended or adjusted under 35 U.S.C. 154(b) by 156 days.

(21) Appl. No.: 13/709,189

(22) Filed: Dec. 10, 2012

(65) Prior Publication Data

US 2013/0159333 A1    Jun. 20, 2013

Related U.S. Application Data

(60) Provisional application No. 61/570,606, filed on Dec. 14, 2011.

(51) Int. Cl.
*G06F 17/30* (2006.01)
*G06Q 50/00* (2012.01)

(52) U.S. Cl.
CPC .... *G06F 17/30386* (2013.01); *G06F 17/30613* (2013.01); *G06Q 50/01* (2013.01)

(58) Field of Classification Search
CPC .............. G06F 17/30; G06F 17/30867; G06F 17/30241; G06F 17/30345; G06F 17/30598; G06F 17/27; G06F 17/30265; G06F 17/30312; G06F 17/3053; G06F 17/30545; G06F 17/30554; G06F 17/30575; G06F 17/30581; G06F 17/30699; G06F 17/30705; G06F 15/16; G06F 3/048; G06F 3/0481; G06F 3/00; G06F 3/0485; G06F 3/0489; G06F 3/0482; G06F 21/105; G06F 21/62; G06F 21/6245; G06F 21/31; G06F 15/00; G06F 15/17306; G06F 19/3406; G06F 19/3481; G06F 17/20; G06F 17/21; G06F 17/2785; G06F 17/30286; G06F 17/303; G06Q 10/10; G06Q 30/02
USPC ................. 707/722, 770, E17.014, 609, 748, 707/E17.033, 610, 614, 736, 738, 754, 758, 707/769, 781, 812, 705, 737, 741, 750; 709/204, 206, 205, 217, 219, 223, 224; 715/753, 739, 756; 726/4, 28, 27, 7
See application file for complete search history.

(56) References Cited

U.S. PATENT DOCUMENTS 7,747,746 B2    6/2010  Thayer et al.
8,458,584 B1 *  6/2013  Wilson et al. ................. 715/234

(Continued)

OTHER PUBLICATIONS

Adamic, L. A., Zhang, J., Bakshy, E., & Ackerman, M. S. (Apr. 2008). Knowledge sharing and yahoo answers: everyone knows something. In Proceedings of the 17th international conference on World Wide Web (pp. 665-674). ACM.*

(Continued)

*Primary Examiner* — Ann Lo
*Assistant Examiner* — Diedra McQuitery
(74) *Attorney, Agent, or Firm* — Daniel W. Roberts; Law Offices of Daniel W. Roberts, LLC

(57) ABSTRACT

Provided are a system and method to determine similarities. The method includes gathering metadata from at least one posting by a First User on a first Social Network to define at least one First Field associated with at least one First Entity, each associated First Field having a value. The method evaluates responses to the posting by at least one Third Party, and in response to the Third Party using one or more of the First Fields, increments the value of each used First Field. An indication of the values of each First Field associated with each First Entity is provided, the indicated values permitting a determination of similarity to at least one Second Entity querying for at least two Fields. An associated system for determining similarity is also disclosed.

41 Claims, 10 Drawing Sheets

(56) References Cited

U.S. PATENT DOCUMENTS

| | | | |
|---|---|---|---|
| 2007/0294230 A1* | 12/2007 | Sinel et al. | 707/3 |
| 2008/0091656 A1* | 4/2008 | Charnock et al. | 707/3 |
| 2008/0114737 A1* | 5/2008 | Neely et al. | 707/3 |
| 2008/0183750 A1 | 7/2008 | Lee et al. | |
| 2009/0320101 A1 | 12/2009 | Doyle, III et al. | |
| 2010/0088753 A1 | 4/2010 | Ayres et al. | |
| 2010/0115114 A1 | 5/2010 | Headley | |
| 2010/0121849 A1* | 5/2010 | Goeldi | 707/736 |
| 2010/0122347 A1 | 5/2010 | Nadler | |
| 2010/0205168 A1* | 8/2010 | Yang et al. | 707/709 |
| 2011/0196927 A1* | 8/2011 | Vance | 709/204 |
| 2011/0231382 A1* | 9/2011 | Xu | 707/706 |
| 2011/0246456 A1* | 10/2011 | Weitz et al. | 707/724 |
| 2012/0005203 A1* | 1/2012 | Brzozowski et al. | 707/732 |

OTHER PUBLICATIONS

PCT International Search Report for International Application PCT/US2012/069010, search report data of mailing Mar. 28, 2013.

* cited by examiner

FIG. 3

| User Authentication Database | | | |
|---|---|---|---|
| User ID | User Name(optional) | User Password | Date of Entry |
| Spiff | Spiff Jones | ***** | 8/23/10 |
| Dan_Man | Dan Mann | ***** | 9/15/10 |
| ... | | | |
| | | | |

| User Social Networks (User ID:Spiff) | | | |
|---|---|---|---|
| SN Name | SN IP Address | Username | Password |
| Social Media Site 1 | ... | Spiff28 | ***** |
| Social Media Site 2 | ... | Spiff_73 | ***** |
| Social Media Site 3 | ... | Spiff_jones_73 | ***** |

| User Social Networks (User ID:Dan_Man) | | | |
|---|---|---|---|
| SN Name | SN IP Address | Username | Password |
| Social Media Site 1 | ... | Dan_Man | ***** |
| Social Media Site 2 | ... | Dan_Man06 | ***** |

Topic Field Values For All Users(Topic Name: "Einstein's Gratest Contribution")

| User ID: Spiff | | User ID: Mark | | User ID: Jill | | User ID: Dan | |
|---|---|---|---|---|---|---|---|
| Field | Field Value | Field | Field Value | Field | Field Value | Field | Field Value |
| Physics | 1.75 | E=mc2 | 1.75 | E=mc2 | 0.5 | E=mc2 | 0.375 |
| Einstein | 1.25 | Physics | 1.0 | | | Nuclear Weapons | 0.75 |
| | | Einstein | 0.5 | | | Nuclear Power | |

502     504     506     508

510

Discussion Collection
"Einstein's Gratest Contribution"

| Field | Field Value |
|---|---|
| E=mc2 | 4.25 |
| Physics | 2.75 |
| Einstein | 1.75 |
| Nuclear Power | 1.0 |
| Nuclear Weapons | 1.0 |

512

Sub-Community - Intro Science
"Einstein's Gratest Contribution"

| Field | Field Value |
|---|---|
| E=mc2 | 4.25 |
| Physics | 2.75 |
| Einstein | 1.75 |
| Nuclear Power | 1.0 |
| Nuclear Weapons | 1.0 |

514

Community - MTT University
"Einstein's Gratest Contribution"

| Field | Field Value |
|---|---|
| E=mc2 | 4.25 |
| Physics | 2.75 |
| Einstein | 1.75 |
| Nuclear Power | 1.0 |
| Nuclear Weapons | 1.0 |

516

Sub-Community - Intro Science TOTALS

| Field | Field Value |
|---|---|
| Physics | 297.02 |
| Science | 198.23 |
| Biology | 180.03 |
| .... | .... |
| E=mc2 | 45.9 |
| Einstein | 38.75 |
| Nuclear Power | 8.72 |
| Nuclear Weapons | 4.9 |

518

Community - MTT University TOTALS

| Field | Field Value |
|---|---|
| Online Education | 1233.97 |
| Science | 957.23 |
| Physics | 890.03 |
| .... | .... |
| E=mc2 | 245.9 |
| Einstein | 138.75 |
| Nuclear Power | 48.72 |
| Nuclear Weapons | 34.9 |

FIG. 7

Topic Field Values For All Users(Topic Name: "Einstein, E=mc2, Nuclear Power...")

| User ID: Spiff | | User ID: Dan_Man | | User ID: Steve | | User ID: Rick | |
|---|---|---|---|---|---|---|---|
| Field | Field Value | Field | Field Value | Field | Field Value | Field | Field Value |
| E=mc2 | 3.0 | E=mc2 | 1.5 | E=mc2 | 1.0 | E=mc2 | 1.0 |
| Nuclear Weapons | 2.5 | World | 1.0 | World | 1.0 | Nuclear Weapons | 1.0 |
| Nuclear Power | 1.5 | Nuclear Weapons | 0.5 | | | Nuclear Power | 1.0 |

702　　　704　　　706　　　708

700

710

Discussion Collection "Einstein, E=mc2, Nuclear ..."

| Field | Field Value |
|---|---|
| E=mc2 | 6.5 |
| Nuclear Weapons | 4.0 |
| Nuclear Power | 2.5 |
| World | 2.0 |

712

Sub-Community - Science Sectoin "Einstein, E=mc2, Nuclear ..."

| Field | Field Value |
|---|---|
| E=mc2 | 6.5 |
| Nuclear Weapons | 4.0 |
| Nuclear Power | 2.5 |
| World | 2.0 |

714

Community - Megathread Post "Einstein, E=mc2, Nuclear ..."

| Field | Field Value |
|---|---|
| E=mc2 | 6.5 |
| Nuclear Weapons | 4.0 |
| Nuclear Power | 2.5 |
| World | 2.0 |

716

Sub-Community - Science Sectoin TOTALS

| Field | Field Value |
|---|---|
| Physics | 1723.03 |
| Science | 1567.23 |
| Biology | 1293.2 |
| .... | .... |
| E=mc2 | 636.33 |
| Einstein | 176.32 |
| Nuclear Power | 23 |
| Nuclear Weapons | 21 |

718

Community - Megathread Post TOTALS

| Field | Field Value |
|---|---|
| Online Education | 21003.01 |
| Science | 19203.23 |
| Physics | 12890.03 |
| .... | .... |
| E=mc2 | 636.33 |
| Einstein | 176.32 |
| Nuclear Power | 23.2 |
| Nuclear Weapons | 21.1 |

SYSTEM AND METHOD FOR DETERMINING SIMILARITIES BETWEEN ONLINE ENTITIES

CROSS REFERENCE TO RELATED APPLICATIONS

This application claims the benefit under 35 U.S.C. §119 (e) of U.S. Provisional Application No. 61/570,606 filed Dec. 14, 2011, the disclosure of which is incorporated herein by reference.

FIELD OF THE INVENTION

The present invention relates generally to identifying and quantifying similarities of interests between different Entities in a Social Network environment. More specifically, it relates to exchanges that occur between a plurality of Users and the ability to track and establish a valuation of similarity for one or more elements such as Fields of interest.

BACKGROUND

The Internet is rapidly becoming a global community of information exchange. This growth in connectivity, coinciding with the evolution of hand held devices makes Internet connectivity and socialization a growing part of our immediate, everyday lives. Evolving Social Networks, search engines and the ability to share personal opinion through community platforms are creating an increasing social complexity and a glut of social data and information that is challenging the effectiveness of the Internet's open-source architecture. This requires certain systematic standards that recognize the value of online Users and the information they share in order to provide more meaningful connections between people and information.

Within the context of a single Social Network, most people are familiar with the natural and free flowing exchanges and discussions that tend to develop. Whether the topic of discussion be that of endurance sports, surfing, pets, gardening, cooking, survival tactics, dating, wine & cheese, education, business, politics or just about anything, there seems to be no shortage of people willing to offer comment and suggestion.

Yet there is no standard in place for valuing people and the information they share. Therefore, recipients or later readers of such a discussion are left entirely to their own assessment for evaluating who is and is not a valid contributor. In addition, although there is a vast amount of information provided by most Social Networks, it is often very difficult for a person to discover posts, discussions, communities, or even just other Users who either share similar views or perhaps may be a credible and valuable resource for learning something new.

More specifically, a comment about surfing locations, boards or wax may well be offered by a life time surfer who truly knows his or her stuff, or a land locked person who has never seen the ocean and despises the surfing culture. The simple use of terms related to Surfing by the primary author is not really sufficient by itself to establish the author as an authority, and a simple searching on those terms may or may not result in helpful identification of that author as a good source for surfing information.

As users become more reliant upon search engines to find information, it is very desirable for the search engines to be more accurate in identifying the meaning of search criteria. Likewise there is a growing need for social networks to provide more meaningful connections between people and information. The challenge lies in understanding such an expression as "Hot Dog." Does this mean the food, a canine with an elevated blood pressure or an expression of amazement? Likewise the word "Jaguar" could be a jungle cat, a luxury vehicle or the NFL sports team from Jacksonville. Misunderstanding the context of association between the terms may and often does, result in erroneous search results.

In some cases, search engines permit a search wherein a first term is used within X words or characters of a second term. Though perhaps helpful for identifying specific documents or articles, this methodology does not scale to groups of discussion, articles, communities or other related entities and still may not recognize the context as intended by the author. Moreover, such search systems are constructed with the view that if terms exist within proximity to each other they must be related—but this is not always the case. In addition, such methodology is focused strictly on the relationship of the terms with respect to each specific document and can not and does not permit a greater awareness of the relationship of the terms in a greater context.

Though perhaps an extreme example, the issues of identifying similarities with other Users or Entities such as posts, discussions, or other online communities may be quite important when a parent is looking for safe birthday ideas for children, advice on nut allergies or other issues where misguided responses or even intentionally malicious responses could pose actual harm.

The frustrations with a single site are appreciated to compound when looking at multiple sites. A User very qualified for a particular subject, say marathons, may be entirely new to a site and therefore even regular contributors may not recognize him or her, let alone appreciate that there are interests in common Nor will this User be able to find the Entities i.e. other Users, posts, discussions, or other communities that suit his varying degrees of interest.

Subsequently the ability to authentically recognize credible and reliable sources that relate to specific subjects of interests not only benefits the end User, but also communities, institutions, governments and all forms of organizations by enhancing semantic and social analytics, consumer trends, ad targeting, market and product analysis, while providing a more viable source for ratings, feedback and reviews.

In essence, the open-architecture of the Web requires a better standard for providing the right information to the right people at the right time. A system that generates authentic credentials and establishing accurate similarities, as a means to filtering information or controlling privacy, visibility, and connectivity between people and information, would serve the best interest of the people and organizations that use the Web. The lack of an authentic social standard has resulted in misinformation, intrusive advertising, threats to privacy, and malicious behavior by unwanted, trolling individuals over open forums and discussions.

Due to these concerns, the Web is still unsafe when it comes to the open exchange of knowledge and information, therefore, private institutions such as enterprises, schools, universities, governments, or other organizations, are reluctant to embrace open social integration that would benefit their cause (i.e. research and development, training, education, job placement, cross-platform communication, community management, social integration, etc.)

Since the Internet is an open-source architecture, Web social organization is beyond the scope of conventional approaches to social organization and this presents an extremely complex situation to network based (e.g., Internet) Social Networking organization.

What is necessary is a systematic standard for establishing online credentials in order to recognize the similarities between the various parts of social networking, i.e. the keywords, the people, their posts, the discussions, the communities, groups, etc., thus providing privacy and safety through better organization between the different elements of the social Web.

Hence there is a need for a method and system of determining similarities between Entities that is capable of overcoming one or more of the above identified challenges.

SUMMARY

Our invention solves the problems of the prior art by providing novel systems and methods for determining similarities between online entities.

In particular, and by way of example only, according to one embodiment of the present invention, provided is a method to determine similarities on at least one Social Network including: gathering metadata from at least one posting by a First User on a first Social Network to define at least one First Field associated with at least one First Entity, each associated First Field having a value; evaluating responses to the posting by at least one Third Party, and in response to the Third Party using one or more of the First Fields, incrementing the value of each used First Field; and providing an indication of the values of each First Field associated with each First Entity, the indicated values permitting a determination of similarity to at least one Second Entity querying for at least two Fields.

In yet another embodiment, provided is a method to determine similarities between online Entities on at least one Social Network including for each entity: establishing a Database of Fields collected from a First Discussion on a first Social Network, the Discussion including a plurality of postings by at least one first User and at least one second User, the Fields associated with at least a First Entity; assigning a value to each Field based on frequency of use of each Field within the First Discussion; and evaluating the values of each Field to one another to establish a first table providing a context of association between Fields to identify the First Entity has having a quantified level of interests as identified by each Field, the values permitting a determination of similarity to at least one Second Entity.

Still, in yet another embodiment, provided is a system for determining similarities between Entities including: a Metadata Gatherer structured and arranged to gather metadata from at least one first Social Network regarding at least one User identity, the gathered metadata including at least one Field obtained from at least one posting by the at least one User identity and subsequent third party responses to the at least one User identity; a Database structured and arranged to associate the at least one Field to at least one Entity; and a value determiner structured and arranged to determine a cumulative value for each Field associated to each at least one Entity, the value for each Field determined by assigning a value to at least a portion of the metadata of each third party response, evaluating the values of each Field to one another to establish a first table providing a context of association between Fields to identify the First Entity having a quantified level of interests as identified by each Field, the values permitting a determination of similarity to at least one Second Entity.

And in yet another embodiment, provided is a non-transitory machine readable medium on which is stored a computer program for determining similarities between online Entities on at least one Social Network the computer program comprising instructions which when executed by a computer system having at least one processor performs the steps of: gathering metadata from at least one posting by a First User on a first Social Network to define at least one associated First Field provide by the at least one First User and occurring in the at least one posting, each associated First Field having an initial value; evaluating responses to the posting by at least one Third Party, and in response to the Third Party using one or more of the associated First Fields in the response, incrementing the value of each used associated First Field; and providing an indication of the values of each associated First Field associated with each First Entity, the indicated values permitting a determination of similarity to at least one Second Entity.

Further, according to one embodiment of the present invention, provided is a method to determine similarities on at least one Social Network including: gathering metadata from at least one posting by a First User on a first Social Network to define at least one First Field associated with at least one First Entity, each associated First Field having a value; gathering metadata from at least one Third Party response to the posting by the First User to define at least one Second Fieldled associated with at least one Second Entity, each associated Second Field having a value; evaluating the metadata of the at least one Third Party response related to the posting by the First User to increment the value of the at least one First Field as associated with each First Entity; and providing an indication of the value of each First Field and Second Field associated with each First Entity and Second Entity to indicate a value of similarity between each First Entity and Second Entity.

BRIEF DESCRIPTION OF THE DRAWINGS

At least one method and system for determining similarity between Entities of at least one site will be described, by way of example in the detailed description below with particular reference to the accompanying drawings in which like numerals refer to like elements, and:

FIG. 3 illustrates exemplary Database entries for known User Identities in accordance with at least one embodiment;

FIG. 5 illustrates exemplary Database entries for at least a group of Entities involved in the Discussion shown in FIG. 4 in accordance with at least one embodiment;

FIG. 7 illustrates exemplary Database entries for at least a group of Entities involved in the Discussion shown in FIG. 6 in accordance with at least one embodiment;

DETAILED DESCRIPTION

Figure 1:
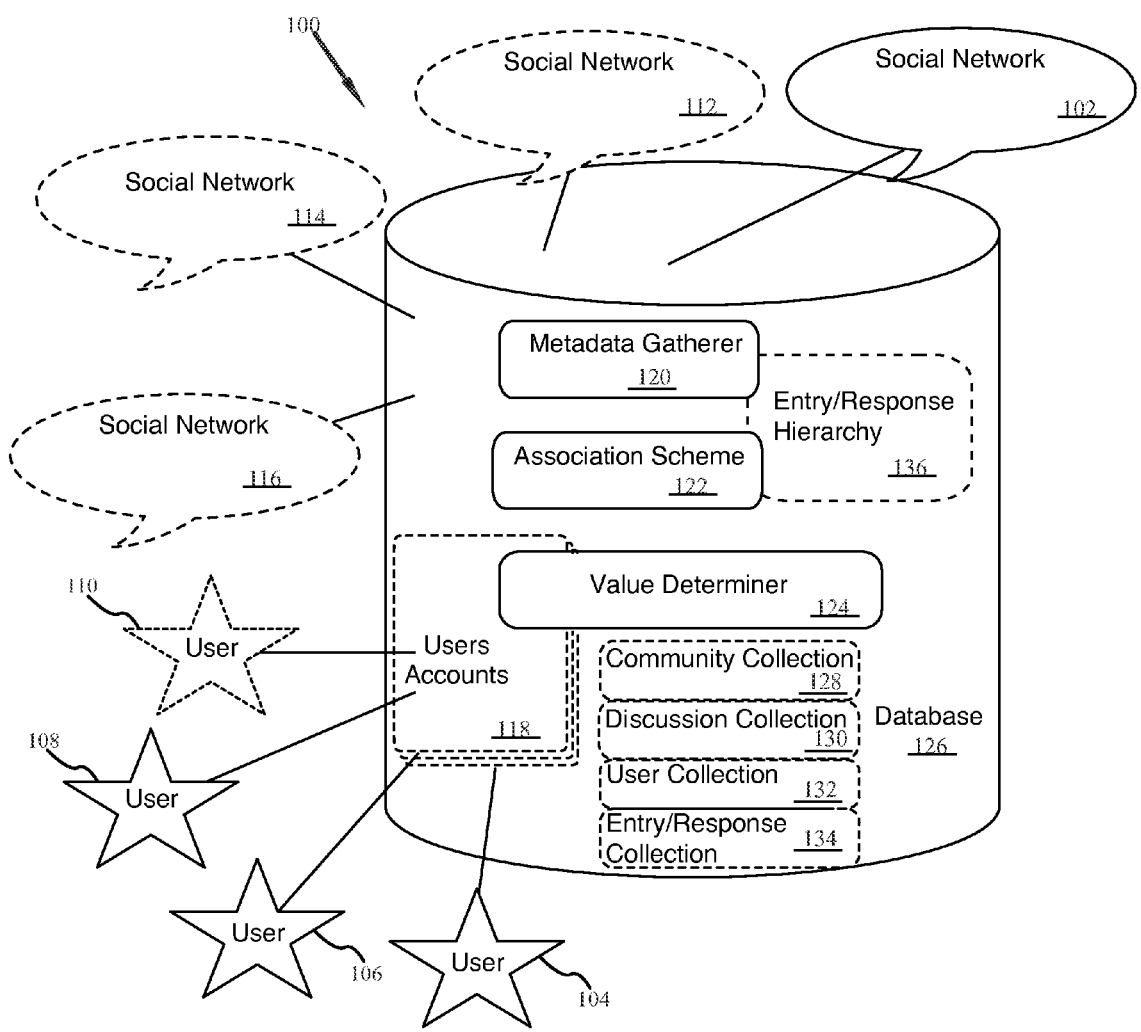
FIG. 1 illustrates a high level conceptual view of the Similarity Determining System in accordance with at least one embodiment.

Before proceeding with the detailed description, it is to be appreciated that the present teaching is by way of example only, not by limitation. The concepts herein are not limited to use or application with a specific system or method for determining similarity between Entities. Thus although the instrumentalities described herein are for the convenience of explanation shown and described with respect to exemplary embodiments, it will be understood and appreciated that the principles herein may be applied equally in other types of systems and methods involving the determining similarity between Entities.

To further assist in the following description, the following defined terms are provided.

"Social Network" as used herein is also understood and appreciated to be any online community platform where Users are identified by some form of User_ID and make some level of exchange between themselves through Entry/Response. In other words a Social Network is appreciated to be any Internet based system that provides any form of media (i.e., posts, blogs, articles, products, pictures, audio commentary, music, pictures video, responsive email, chat, etc. . . . ) that can be responded to by identified Users of that system. Moreover, in some embodiments the Social Network may be described as an online community platform. At times these online community platforms can contain sub communities within a parent community, such as in news media where a parent community might have different sections such as sports, politics, business, etc., or in an education setting where an online University may have different departments, courses, etc.

"Entity"—An Entity is recognized and defined by Fields and their Values that are generated through Users Entry/Responses in online Discussions. Typically, and reviewing from the bottom up, Social Network Users provide Entries/Responses that form Discussions and Discussions occur within Communities. Each User, Entry/Response, Discussion, Community and Social Network itself may be viewed as an Entity, with each higher order entity (e.g., the Discussion), comprising lower order Entities (e.g., the Entries/Responses by Users). Likewise, community Entities can be the children of parent communities as is the case for an online class room that is part of a department of a university. The Fields and Field Value of each higher order Entity is the result of the aggregation of all of its lower order Entities. For example: the a Discussion's Field's and Field Values are the result of all Field and Field Values that arise from each User's Entry/Response within that discussion. Determination of Similarity is made on an Entity to Entity basis where each Entity may be a high order or low order entity. There are other forms of Entities, such as an Interest Group, which is further defined below.

"User"—He or she who is providing the data in an Entry/Response. Users are also considered Entities based on the Field and Field Values they receive through online Discussion.

"Community"—An Entity that relates to a forum or group of Discussions having at least one commonality. This commonality can be something as simple as the desire to share information over the Web, as with massive sized social networks. Communities can also be hierarchical and share something more specific. Such as the class "Introduction to Physics" is a community that is itself a sub-community of the University providing the class. Likewise a section of a Social Network site dedicated to Science is a Community that is itself a sub-community from the overall Social Network, and a sub-community such as Astronomy or Physics may each be a sub-community of the Science Community.

"Entry"/"Response"—An Entity that is defined by the data provided by a User in a posting or in response to a posting on an Internet based Social Network site, and/or community platform. For example, but not limited to, a post, article, tweet, like, dislike, rating, product, picture, comment, email, instant message, or other indication or expression of an opinion of any separable entity involved in the Web. Moreover, the data may be textual—as in a written comment, non-textual—as in a "Like" or a "Thumbs Up", or a combination of textual and non-textual elements such as a textual Response that includes a rating scale. Since each Entry/Response may insight a tangent discussion, each Entry/Response can also be considered its own Discussion.

"Entry/Response Hierarchy"—The Entry/Response Hierarchy is defined through Entries and subsequent Responses that create threaded, or nested, Discussions that relate to a specific topics of interest. Every time a new original Entry/Response is made, a new Hierarchy can be created and this begins a new Discussion. Since each Entry/Response may insight a tangent discussion, each Entry/Response can also be considered its own Discussion. Every time an Entry/Response is made in relation to an existing Hierarchy, the Hierarchy is adjusted for that Entry/Response. The Entry/Response Hierarchy is used to define the levels of engagement in order to determine appropriate Field Value for branching out discussions.

"Discussion"—Discussions are Entities started by and defined from Entries and Responses to those Entries. Through subsequent Response to an Entry the Entry/Response Hierarchy is generated based upon specific topics of interest and this results in a Discussion. Since each Entry/Response may insight a tangent discuisison, each Entry/Response can also be considered its own Discussion. Discussions are subjects that draw others Users to respond to the data posted by Users, and are defined by an initial entry, article, post, blog, tweet, product, email, instant message or anything that can be responded to, rated, or commented on, that would start a threaded Discussion.

"Metadata"—This is data about data and relates to tags, or key words, that are extracted and recognized within this system and method as Fields. Indeed, the metadata may be the data itself as directly provided by a User in an Entry/Response, an indicator such as a rating (like or dislike, thumbs up or thumbs down, etc. . . . ), and data associated with any form of an Entry/Response, such as but not limited to, the site IP, date, time, author, last editor, etc. . . . .

"Field(s)"—Are relational entities such as Metadata, tags, key words, or key terms as are commonly understood in searching and organizing data. Fields are defined from an Entry/Response through information generated from the information provided by the source of Entry and all Responses to that Entry. Fields can be generated by the 3rd-party Social Network, Users or the Similarity Determining System itself. These may be one or more terms. Fields create universal Metadata that are specific to the Similarity Determining System and can be utilized across a plurality of Social Networks in order to recognize similarity between Entities. A Field can also be recognized as an Entity—as a Field builds associations to other Fields through their shared associations to other Entities. When matching Fields between Entities, the system can also determine similarities between non-identical Fields, therefore, a Field can be a pseudonym, abbreviation, or slang and still match a similar Field. For example: a term such as "Fished", could be associated with "Fishing," or "'Fins" could be associated with "Dolphins," or "MJD" could be associated with a famous football player named "Mourice Jones-Drew" etc.

"Field Value"—Is the value applied to a Field. Moreover, a Field in a new original Entry, or a new Field to an existing discussion has no Field Value, or a Field Value of 1. As discussed below, for at least one embodiment Field Value is based on the frequency of Responses overall, where the Response is located in the Entry/Response Hierarchy, the Ratings from those Responses, as well as the frequency of Field usage in subsequent Responses. The overall Field Value applied to a User or Entity in Association to a Field is the aggregate of all Field Values defined through Discussions that relate to that Entity.

"Interest Group"—A grouping of two or more Fields and their values which can be defined by the Similarity Determining System or an Entity such as a User or a Community. Since Interest Groups are comprised of Fields and Values they are also considered an Entity. Interest Groups provide more accurate similarities based on the number of Fields it provides for matching similarities between Entities. For example: a User could create an Interest Group called "Surfing California" and include the Fields "Surfing," "California," "Beaches" and this would create more accurate similarities between Entities that share these same levels of interest. Likewise, Interest Groups can assist by providing greater accuracy in determining similarities between entities. They can also be used for visibility and privacy settings between entities.

To briefly summarize, provided is a system and method for determining similarities between Entities on at least one Social Network. This determination of similarities is in essence based upon $3^{rd}$ party Responses and/or exchanges occurring over at least one Social Network, and not a User's own statements of self worth. Moreover, it is a system and method that involves gathering metadata from at least one Discussion involving at least one User identity on a first Social Network. This Metadata is used to define at least one First Field associated with at least one First Entity. The Metadata of at least one third party Response relating to the posting is then evaluated and in Response to the Third Party using one or more First Fields, the value of each used First Field is incremented. An indication, such as a total value, of each First Field associated with the First Entity is then provided, the indicated values permitting a determination of similarity to at least one Second Entity querying for at least two Fields as an Interest Group.

In other words, the degree of similarity is understood to be determined both by the appearance of common Fields between two Entities, but also how the Fields relate to one another within their association to each Entity. More specifically, an Entity such as a User, a Post, a Discussion, a Group, or a Community having the Fields "Beach" "California" and "Surfing" is more similar to another Entity having these same Fields of similar value. Yet another Entity having only the Fields "Beach" and "Surfing" of dissimilar values may indicate that these Fields are not used in the same context or frequency. Indeed the Similarity Determining System 100 does not merely query for common terms among Entities, but assists Users in further understanding the possible degrees of similarity by also providing an indication for how those terms are used in relation to each other, by or in context with the Entity.

Moreover, for at least one embodiment, the Similarity Determining System has the ability to receive information and more specifically, information that defines Fields through metadata, tags and key words, including information that defines ratings. In at least one embodiment this information also includes the designation of a Discussion, as an Entity, which as stated in the definitions above is initiated from the initial Entry/Response, or subsequent Entry/Response, that would start and build the Entry/Response Hierarchy. Indeed a Discussion may arise from an initial posting, or a new Discussion may emerge from a subsequent Entry/Response where a new topic of interest for Discussion is introduced.

By implication, as the User may be an Entity of low order, and a Community to which the User belongs may be an Entity of higher order, the association of the Fields to the User may also be attributed to higher order Entities to which the User is related, for example—the Discussion, the Community, and the Social Network are all Entities.

FIG. 1 is a high-level block diagram of an embodiment of the Similarity Determining System 100. As shown the Similarity Determining System is in communication with a first Social Network 102, and at least one or more Users, of which Users 104, 106, 108 and 110 are exemplary. In at least one embodiment, the Similarity Determining System 100 is a component of the first Social Network 102

The first Social Network 102 and the Similarity Determining System 100 are understood and appreciated to be one or more computer systems, (including microprocessors, memory, and the like) adapted at least in part to provide the first Social Network 102 and the Similarity Determining System 100. More specifically each may be a general computer system adapted to operate as a Social Network, such as first Social Network 102 and/or the Similarity Determining System 100, or a specialized system that is otherwise controlled by or integrated with a computer system.

For such embodiments, Users 104, 106, 108 and 110 may be identified as known or registered Users on the basis of having established accounts with the first Social Network 102. In such embodiments, the Users of the first Social Network and more specifically the Similarity Determining System 100, may not need to provide additional information to the Similarity Determining System 100 to permit monitoring and determination of similarity to occur as their respective associated User IdEntities are already known as are the parameters of the first Social Network 102.

In varying embodiments, Users 104, 106, 108 and 110 may become known or registered Users by establishing User' Accounts 118 directly with the Similarity Determining System 100. For embodiments wherein the Similarity Determining System 100 is in communication with a plurality of Social Networks, e.g., first Social Network 102 and one or more second Social Networks 112, 114, 116, additional access information for all of Social Networks may be provided by the User in his or her User Account 118.

In addition, each User Account 118 may define one or more User IdEntities that are associated with the known User in various different Social Networks. Moreover, for at least one embodiment, the User Accounts 118 define for the Similarity Determining System 100 the User Identities to be monitored, evaluated, authenticated and reviewed for similarity with other Entities upon one or across many Social Networks.

In at least one alternative embodiment, the Similarity Determining System 100 is distinct from the Social Network 102. Further, whether a component of the first Social Network or distinct from the first Social Network, in varying embodiments the Similarity Determining System 100 is also in communication with a plurality of second Social Networks, of which second Social Networks 112, 114 and 116 are exemplary.

To facilitate this, in at least one embodiment, the Similarity Determining System 100 has a Metadata Gatherer 120, an Association Scheme 122, a Value Determiner 124 and a Database 126. For at least one embodiment, the Similarity Determining System 100 is a an adaptation of U.S. patent application Ser. No. 13/239,100 filed Sep. 21, 2011 and entitled "System and Method for Authenticating a User through Community Discussion" incorporated herein by reference. More specifically, application Ser. No. 13/239,100 teaches at least one system and method for assigning value to Fields occurring in an online community discussion—these values being used by the present invention for determining similarity between other Entities. For such an adaptation, the Value Determiner 124 is substantially the authenticator as set forth and described in application Ser. No. 13/239,100. For the sake of this application this valuation and authentication process is extend to other Entities, not just to Users, but to their posts (i.e. Entry/Response,) the Discussions, the Communities, the Social Network and other Entities that relate to the source of authentication described in application Ser. No. 13/239,100.

As is further discussed below, the Database 126 is structured and arranged to track and associate use of Fields to Entities, such as but not limited to the Social Network, the Community, the Discussion, the Group, the Posts (i.e. Entry/Response,) each User engaged in the Discussion, as well as the Fields themselves. Moreover for each potential Entity as defined for an instance of the Similarity Determining System 100, the Database 126 provides collections of Fields, such as the Community Collection 128, Discussion Collection 130, User Collection 132, Entry/Response Collections 134, and/or other Entity collections, not shown. Of course, within each collection there may be sub-collections, such as the Discussion Collection 130 having internal collections for each Entry/Response.

The Metadata Gatherer 120 in connection with the information provided in the User Accounts 118 monitors community activity within at least the first Social Network 102. When any User established with the Similarity Determining System 100 makes an Entry or Response, the Similarity Determining System 100 gathers, via the Metadata Gatherer 120, appropriate data from the Entry or Response and the subsequent Responses. This includes attributes such as date and time, User name, message content, message title, tags, key words, ratings information, etc. . . . . Moreover, the data from the Entry or Response may be any data associated with the Entry or Response—that which is provided directly as the textual or non-textual Entry or Response or that which is supplementary to the Entry or Response.

In at least one embodiment, the gathered metadata will include at least one Field obtained from at least one posting by a known User identity and subsequent third party Responses to the known User identity. The Database 126 is structured and arranged to record the association of at least one Field to the known User identity. For embodiments where the User account 118 are not specifically maintained by the first Social Network 102, the Database may further be structured and arranged to maintain the User Accounts 118 as well.

As is further explained below, for at least one embodiment, if the Similarity Determining System 100 determines that the User posting the Entry/Response is not a known or registered User, the Similarity Determining System 100 may invite the User to become a registered User and therefore also enjoy the benefit of the system. For yet other embodiments, the User posting the Entry/Response need not be a known or registered User for the value of one or more Fields to be increased and the determination of similarity thereby improved.

Metadata, tags, and key words generated from the Entry/Responses as text become Fields and permit the Similarity Determining System 100 to establish relationships between other Entities through associations to Fields derived from the Entry/Responses within the Discussion. Data generated from non-registered Users enters the Entry/Response Hierarchy in order to maintain the flow of Discussion in relation to topic of interest. However, in at least one embodiment as the User is not a registered User, the entry of the data does not create associations or Field Values related to the unregistered User.

In another instance if an unregistered User can be identified through a unique identifier such as an email address, password, or unique User name, then the non-registered, identifiable Users, their associated Fields, and the values of these Fields, can be determined and sent to a temporary Database location. If this User decides to become a registered User of the system, these Fields and there values can be immediately updated to their profile after proof that they are that actual User.

The Association Scheme 122 recognizes the Associations between an Entity, such as for example the registered Users, and defined Field(s). The Similarity Determining System 100 builds an aggregate of associations based upon frequency and usage of specific Fields per Entry/Responses by each User. As the Fields are tracked with respect to the developing Entry/Response Hierarchy the Users who engage in the Discussion, their Entry/Response, the Discussion itself, and the Community in which the Discussion is occurring, each of these Entitles may be ascribed an associated value for each Field.

These Fields and their associated Field Values are indicated to Users and other Entities of the Similarity Determining System 100, and in at least one example this is achieved with a popup or hovering window that provides at least a partial listing of the Fields and their associated values. As the values are also evaluated against one another, they provide a context of association between the Fields so as to identify the First Entity as having a quantified level of association as identified by the value of each Field. Moreover, the context of association for at least one embodiment is determined by comparing the values of each Field and ranking them—such as in ascending or descending order. A first Field having a value of 70% or greater of a second Field is evaluated to have a stronger context of association as compared to a first Field having a value of 30% or lesser of a second Field Of course it will be appreciated that higher order Entities may see an aggregation of identical Fields—for example a first User's Entry/Response may have an associated Field "Marathons" with a developed point value and a second User's Entry/Response may also have an associated Field "Marathons" with a developed point value. As both the first User's Entry/Response and the Second User's Entry/Response are part of the same Discussion, called "Disney Marathons" the Discussion Entity "Disney Marathons" receives value for the Field "Marathons" from both the first and second User's Entry/Response. The aggregation of value is specific to Users Entry/Response, which aggregate into the value for the Discussion, the Community, and any parent Communities that may exist.

Where the Similarity Determining System 100 is in communication with a plurality of Social Networks, this reference of association permitting a determination of similarity is viable across the plurality of Social Networks with respect to different Entities.

In varying embodiments, the Metadata Gatherer 120 and/or the Association Scheme 122, alone or in varying degrees of combination may establish the Entry/Response Hierarchy 136 as a substantially distinct component of the general Database 126.

The Value Determiner 124 determines Field Values for each Entry/Response. For at least one embodiment this determined Field Value is also based on depth of subsequent User Entry/Response. This Field Value is triggered by each subsequent Entry/Response, and is adjusted by order in the Entry/Response Hierarchy, and/or Ratings Adjustment, and Field Average as is defined by the prior art in U.S. patent application Ser. No. 13/239,100. For at least one alternative embodiment, Field Value is determined by frequency of use for each Field, such as for example tag clouding.

Further, for at least one embodiment, the Value Determiner 124 is also structured and arranged to detect non-textual responses, such as but not limited to a "Like," "Thumbs Up," "Smiley," or star rating which are also evaluated and used to adjust Field Values. Moreover, as the Field Value is determined by subsequent responses, whether textual or non-textual, a variety of different methodologies for determining Field Value may also be adapted and employed.

With respect to FIG. 1, it is understood and appreciated that the elements, e.g., Metadata Gatherer 120, the Association Scheme 122, the Value Determiner 124 and the Database 126 are in one embodiment located within a single device, such as for example a computer. In at least one alternative embodiment, these elements may be distributed over a plurality of interconnected devices. Further, although each of these elements has been shown conceptually as an element, it is understood and appreciated that in varying embodiments, each element may be further subdivided and/or integrated within one or more elements.

FIGS. 2-9 provide a high level flow diagram with conceptual illustrations for a Discussion upon an exemplary Social Network site, e.g., first Social Network 102, and subsequently at least one additional Social Network site, e.g., second Social Network 112. It will be appreciated that the described events and method need not be performed in the order in which it is herein described, but that this description is merely exemplary of one method of implementing a method to achieve the Similarity Determining System 100, or more specifically a method of determining similarity between Entities upon one or a plurality of Social Networks.

In addition, for ease of illustration and Discussion the use of textual Discussions have been shown, however it is to be understood and appreciated that other options for media, such as but not limited to one or more pictures, movies, audio files, songs, or even links to other media may be used at least as part of the initial posting. Often, with such media, there is also a clearly identified subject—such as a caption or title. When this exists, the subject is recognized by the Similarity Determining System 100 and method 200 as the original Entry/Response and therefore regarded as a Discussion.

Of course, it is further understood and appreciated that where the posted media is non-textual, metadata may still be collected, such as but not limited to the type of media, time of posting, the User Entity as the source of posting, the Discussion, or the Community itself. For at least one embodiment, a non-textual positive response, such as a "Like," "Thumbs Up," "Smiley," or star rating is recognized and evaluated for at least a partial incremental increase of the point values for the Fields in the posting to which such a non-textual response is offered.

Moreover, if the nature of the Discussion is such that a title is clearly provided, the Similarity Determining System 100 and method 200 accept that as the title of the Discussion. Of course for the determination of similarity, a title is not specifically required, though certainly it may be helpful. If the nature of the Discussion is such that a title is not clearly provided, the Similarity Determining System 100 and method 200 may simply focus on the associated Fields defined within the first level Entry/Response or through recognizing a string of initial characters of that Discussion as its title.

It is also understood and appreciated that the methodology of determining similarity may take many forms. The total number of Responses to an initial posting may be simply tallied, direct Responses may be valued differently from indirect Responses, heuristics may be applied to gage a Response as being positive or negative or neutral, (note: a key component of this system is that it does not need, or use, objective User information such as age, sex, etc. . . . ). Different methodologies for valuation may also be established for different embodiments of Similarity Determining System 100. With respect to the Discussion herein, it is understood and appreciated that the description of determining similarity is merely exemplary of one method of operation in accordance with the present invention, and not a limitation.

Figure 2:
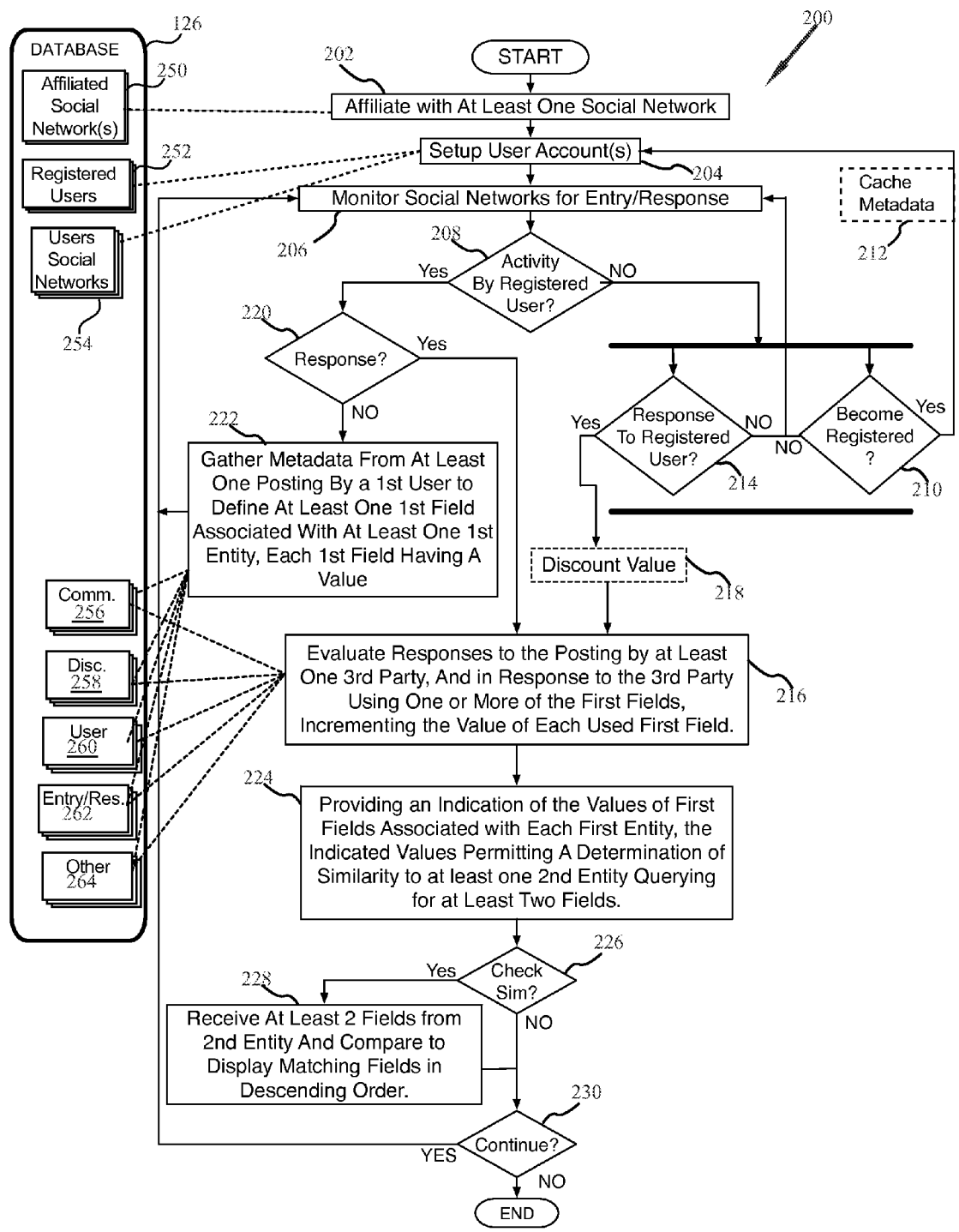
FIG. 2 is a flow diagram illustrating a method of similarity detection in accordance with at least one embodiment.

With respect to FIG. 2, in addition to illustrating the steps of the method 200, there is an attempt to further illustrate, in general, which elements of Similarity Determining System 100 are in play at different stages. Accordingly along the left side of the flow diagram is presented a conceptualization of a Database, such as Database 126, and the correlated elements within the Database.

The Similarity Determining System 100 is, as noted above for at least one embodiment, implemented to provide a determination of similarity across a plurality of Social Networks. It is understood and appreciated that even where multiple Social Networks are involved, determination of similarity can and does occur on individual Social Networks.

As such, in the following description the methodology for determination of similarity is presented with respect to one Social Network, e.g., first Social Network 102, before demonstrating how the determination of similarity may be expanded across multiple Social Networks.

Although for at least one embodiment a base value of perhaps "1" may be initially set for each Field, the subsequent repeated use by the same User does not by itself generate significant additional value. Rather, it is the responses by other Users, i.e., third parties, that generate Field Value, and thus establish credibility for the original User with respect to each Field subsequently used.

With respect to the issue of determining similarity, this value generation based on third parties again further establishes a degree of confidence that the User is indeed a credible source. In addition as the Field Values are relevant to other Entities to which the User is related, i.e., Entry/Response, Discussion, Community and Social Network itself—the third party valuation scheme further establishes credibility for Similarity when seeking matches with any other Entity as well.

As shown in FIG. 2, the method 200 commences with affiliating with at least one Social Network, block 202. For an embodiment where the Similarity Determining System 100 is implemented directly as a component of a Social Network, such as first Social Network 102, the Users of the first Social Network may all be identified as known or registered Users with no further action 204.

For at least one alternative embodiment, whether integrated as a component of the Social Network or not, a User sets up his or her account and provides at least his or her associated User identity and such other relevant information regarding the Social Networks he or she uses, block 204.

With respect to the Database 126, FIG. 2 illustrates that, for varying embodiments, the Database 126 receives and records the basic information, such as affiliated Social Network(s) (records of affiliated Social Network(s) 250), a listing of registered or known Users (records of registered Users 252), and a listing of each User's Social Network(s) (records of Social Networks affiliated with Users 254). These records may certainly be combined, but have been shown distinctly for ease of discussion.

FIG. 3 illustrates conceptual Database records. Specifically, table of records 300 correlate to the listing of registered Users (records of registered Users 252) and illustrate the User Accounts. A first registered User 302 is shown as Spiff Jones and a second registered User 304 is shown as Dan Mann. Additional registered Users are not shown for ease of illustration.

Table of records 306 conceptually correlate to the listing of the first registered User's Social Networks (records of registered Users 252) and specifically illustrate the Social Networks with which User Spiff is associated. As shown, for each Social Network, the registered User, e.g. Spiff, may use a different username 308. Moreover, as each registered User builds his or her history of associated Fields, these associations may transcend across all associated Social Networks regardless of username to permit determinations of similarity across platforms.

Table of records 310 conceptually correlate to the listing of the first registered User's Social Networks (records of registered Users 252) and specifically illustrate the Social Networks with which User Dan_Man is associated. As shown, for each Social Network, the registered User, e.g. Dan_Man, may use a different Username 312. Moreover, as each registered User builds his or her history of associated Fields, these associations may transcend across all associated Social Networks regardless of Username to permit determinations of similarity across platforms Returning to FIG. 2, the Similarity Determining System 100 then commences to monitor the specified Social Network or networks awaiting action by a registered User, block 206. For at least one embodiment, there may be Users who are not registered Users of the Similarity Determining System 100, decision 208. For at least one embodiment, if the initial activity is by an unregistered User these initial postings by such unregistered Users are ignored, and the Similarity Determining System 100 remains in a monitoring state, block 206.

For at least one optional embodiment, postings by un-registered Users are trapped to initiate an offering for these Users to become registered Users, decision 210. This may be accomplished by initiating a new pop-up, application or appliance that informs the User of the presence of the Similarity Determining System 100, its function, features and benefits and how determination of similarity achieved. His or her Entry/Response may also be cached, block 212 during this account set up process so that upon enrolling in the Similarity Determining System 100 he or she is given immediate credit for his or her Entry/Response.

If the un-registered User accepts the offer to become a registered User, he or she is then directed to the process of setting up his or her account, block 204. Of course, if he or she opts not to accept the offer to become registered, the method continues and the un-registered User is simply treated as an un-registered User.

In certain embodiments, Responses by un-registered Users can be used in building Field Value, the values subsequently used in the determination of similarities, if such a Response is related to a prior posting by a registered User, decision 214. Where the posting is indeed a Response, metadata may be gathered, block 216, else the Similarity Determining System 100 remains in a monitoring state, block 206. For at least one embodiment, values generated by the evaluation of this metadata may be discounted as indicated by optional block 218. Moreover, for at least one embodiment, all third party Responses are evaluated in determining values to be used for similarity analysis regardless of whether the third party is a registered or unregistered User.

The Similarity Determining System 100 and method 200 are adapted in at least one embodiment to act and determine Field Value upon the occurrence of non-textual Responses—such as "Likes" thumbs Up, Stars, or other non-textual expressions of approval or disproval. However for ease of illustration and discussion, textual Response are first considered.

When a registered User does initiate an Entry/Response, the Similarity Determining System 100 recognizes that Entry/Response, decision 208, and moves to the determination of whether it is a Response, decision 220. For this new posting, Similarity Determining System 100 gathers data from the posting to define at least one first Field associated with at least one Entity, each associated Field is also initialized with a value, block 222.

Where Similarity Determining System 100 determines the posting to be a Response, decision 220, the Similarity Determining System 100 moves to gathering metadata from the response, and more specifically evaluating the response to the posting by the third party, block 216. In response to the third party using one or more of the first Fields, the Field Value of each used first Field is incremented.

As indicated by the dotted lines, these Field Values are associated with at least one Entity, such as for example the User who provided the first posting. However, these Field Values may also be associated with other Entities, such as Community 256, the Discussion 258, the User 260, as well as Entry/Response 262—indeed other Entities (Other 264) may also be defined, such as but not limited to the entry/response sub-communities, parent-communities, the Discussion itself, and the Social Network.

As the Field Values are adjusted based on the frequency of use within the discussion, and/or the number of responses to an Entry, and/or through subsequent response of each Field, the Similarity Determining System 100 provides an indication of the value for each associated Entity, block 224. Although the Similarity Determining System 100 may display the values for all associated Fields, more typically the Similarity Determining System 100 will display the values of the top Fields, or if responding to a query for similarity the top matching Fields. It should also be appreciated that this indication of values also provides an indication of correlation as between the Fields. For example, higher valued Fields are generally used more commonly with other higher valued Fields then with lower valued Fields.

This indication of value permits a determination of similarity to at least one second Entity querying for at least two Fields. As the Similarity Determining System 100 is aware of Users and defined Entities, the display of Similarity to one or more other Entities can be substantially real time. A User of the Similarity Determining System 100 may also select to query for a determination of Similarity with a specific Entity or type of Entity—i.e., other Users, Posts Discussions, Communities, Fields, Interest Groups, etc.

A User of the Similarity Determining System 100 may also specify a desire to check for similarity, decision 226. In such an instance, Similarity Determining System 100 will receive at least two search terms, i.e., one or more Fields from a second Entity and compare these Fields to the first Entity, the Similarity Determining System 100 further displaying the matching Fields in descending order, block 228. Of course, descending order is merely exemplary of one form of display, alternatives such as ascending, scaled size, color or other ordering or visual queue being selected and applied as appropriate for varying embodiments.

Moreover, the User or system may define Interest Groups defined to be specifically at least two Fields which are used in context with one another. For example a User may define "Surfing" and "Beaches" as an Interest Group or "Marathon," "Disney," and "Running" as another Interest Group. Alternatively the system may recognize at least the top two or more Fields in a Discussion or Community and form an Interest Group automatically for that Discussion or Community. Determinations of Similarity may then be performed by receiving an Interest Group, i.e. at least two associated Fields, and may be performed by looking for other Entities with similar Interests Groups.

In another example, Interest Groups can allow for setting over visibility, connectivity, and privacy between Entities, for example, if a user has an Interest Group that includes the interests "Surfing" "Beaches" "Mexico" "Summer" then this user can use this Interest group to limit their connections to similar entities; i.e. people, posts, discussions, groups, communities, etc. that share similar Fields.

Indeed for at least one embodiment, a Field can be recognized as an Entity—as a Field builds associations to other Fields through their shared associations to other Entities. For instance, if a User has as association to "Surfing" and "Beaches" and "Mexico" the Field "Surfing" would be an Entity that has an association to "Beaches" and "Mexico" for that User. In other words the context of association of one field to another advantageously permits not only identification of similarity, but also the correct context between Fields—i.e., the Field Jaguar in a Discussion about sports teams is significantly different from the Field Jaguar in a Discussion about jungle cats. Similarly, expressions such as "Hot Dog" can be contextually determined based on Discussion to be a food, a canine with an elevated temperature, or perhaps an expression of amazement.

Likewise, it may be assumed that a User Entity with a number of Fields that relate to sports, or more specifically, the National Football League, has a higher probability of using the term Jaguars as it relates to the football team, over Jaguars that may relate to the Jungle cat or the luxury vehicle. For a community dedicated to food, there is a higher probability that the word "Hot Dog" refers to the food rather than a canine with an elevated blood pressure.

This is fundamentally different from searching for a first term within X words or characters of a second term, as the analysis is driven directly by associated contextual use of the fields and not by the arbitrary notion that if used within X the terms must be related. Indeed embodiments of the present invention can establish contextual relationships to be understood with advantageous scope that transcends individual instances of use of the terms and permits contextual awareness with respect to Entities of different types.

With the response evaluated, and an indication of Field Values provided, method 200 will optionally return to a monitoring state, block 206, or end, decision 230. It should be understood and appreciated that method 200 may be applied recursively. Moreover, each response can be used as a trigger to initiate for that particular User and associated Entities the application of method 200 to develop valuation for Fields based on subsequent responses.

Figure 4:
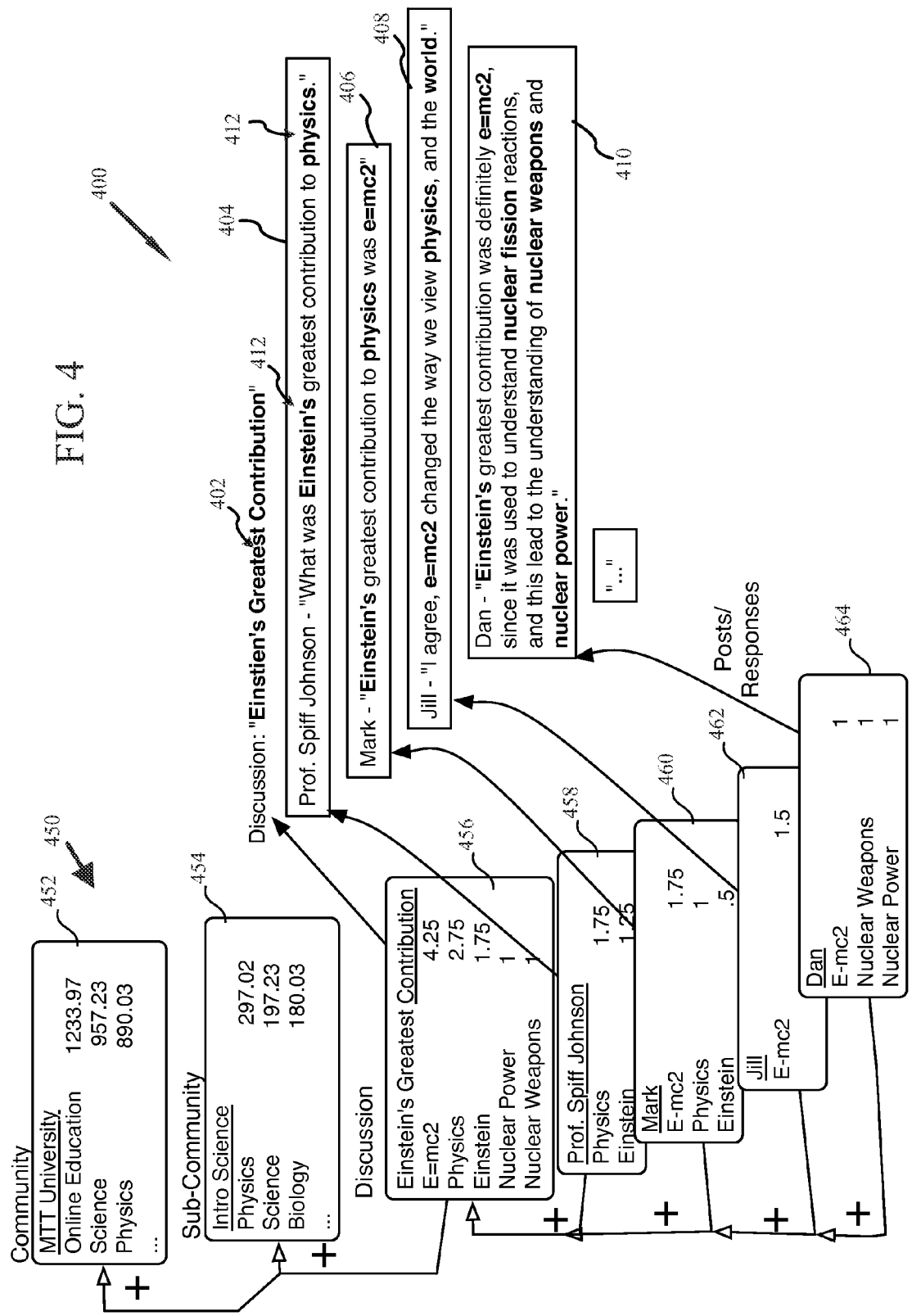
FIG. 4 is a conceptual illustration of a Discussion on a first Social Network involving multiple Entities participating in similarity determination in accordance with at least one embodiment.

FIG. 4 conceptually illustrates at least a portion of Discussion 400 that has evolved on a Social Network site, e.g., first Social Network 102—which for the sake of example is presented as a University's Social Network site where students and faculty can discuss ideas. For each Entry/Response of the Discussion 400, method 200 is applied as described above.

To summarize, the method 200 as applied to Discussion 400 in FIG. 4 is implemented by gathering metadata from at least one posting by a first User to define at least one first Field associated with at least one first Entity, each First Field having a value. Method 200 continues by evaluating responses to the posting by at least one Third Party, and in response to the Third Party using one or more of the First Fields, incrementing the value of each used First Field. And method 200 provides an indication of the values of each First Field associated with each First Entity, the indicated values permitting a determination of similarity to at least one Second Entity querying for at least two Fields.

Returning to FIG. 4, there are shown to be four registered Users—Prof. Spiff Jones, who has commenced Discussion 402 regarding Einstein's greatest contribution, and provided an opening post 404, and Mark, Jill and Dan who have each provided a response, 406, 408 and 410 respectively.

FIG. 4 also provides a conceptual illustration of the Field collections for at least the Entities 450 of the community—MTT University 452, a sub-community—Intro science 454, a Discussion—Einstein's Greatest Contribution 456, and collections for each User—Spiff Jones 458, Mark 460, Jill 462 and Dan 464. The hierarchy of the Entities 450 is also shown.

As shown in Bold, at least the words Einstein and Physics are identified as Fields 412 and associated with Spiff Jones. Likewise, Users Mark, Jill and Dan each have associated Fields that are shown to have accumulated Field Values based on subsequent replies from other Users. For at least one embodiment, Field Value is determined simply by frequency of use. For at least one embodiment, Field Value is determined simply by frequency of Response and/or frequency of Response by unique users. For at least one alternative embodiment, Field Value is determined by at least one method set forth in application Ser. No. 13/239,100, which is to say that the type of response (direct or indirect) Field average and/or weighting may be applied so as to better harmonize the values for improved determinations between large and small instances of use.

More specifically, it is appreciated from FIG. 3 that the Field Values developed with respect to each User's Entry/Response and shown for each User's Entry/Response Collection are accumulated for the Discussion 456. Likewise, additional Discussions that are not shown also have accumulated Field Values and are combined for the Field Values shown for the sub-community Intro science 454. And similarly, multiple sub-communities are combined for the Field Values of the overall Community MTT University 452.

FIG. 5 presents more clearly a plurality of different tables associating the Fields to different Entities. More specifically, table of records 500 shows the Field Values developed for each of the Users. As shown, there are entries for Field Values for Fields used by the User Spiff in column 502, Mark in Column 504, Jill in column 506 and Dan in column 508.

In addition, table of records 510 shows the Field Values developed for the Entity defined as the Discussion 456. Table of records 512 shows the Field Values developed for the Entity defined as the sub-Community, Intro science 454, and table of records 514 shows the Field of Values developed for the Entity defined as the Community MTT University 452.

In addition, table of records 516 shows the Field Values developed for sub-Community Intro science 454 based on all Discussions, occurring within that sub Community, and table of values 518 shows the Field Values developed for the parent Community MTT University 452 based on all Discussions that occurred within all sub-Communities of MTT University.

Moreover, with respect to the Discussion 400, the developed Field Values are shown with respect to several different Entities of varying scope. With respect to the issue of determining similarity, any one may be considered as a first Entity for comparison with a Second Entity. More specifically, for at least one embodiment, a first Entity is selected from the group consisting of, but not limited to, the first User starting initiating the Discussion, the Posting by the first User, the First Social Network, a Community, a Second Social Network, a First Discussion, a Second Discussion, or an Interest (as in a specific Field).

Of course the Second Entity may also be selected from the group consisting of, but not limited to, a Third Party responding to the First User, the Response by the Third Party, the First Social Network, a Community, a Second Social Network, a first Discussion, a Second Discussion or an Interest (as in a specific Field). Moreover, the First Entity and the Second Entity may be any of the different possible Entities that may be recognized by an embodiment of the Similarity Determining System 100.

For the sake of example, a User of Similarity Determining System 100 may indicate that the Discussion 302 is to be the First Entity and he or she is seeking to better gage the level of similarity between this discussion and the total sub-Community of Intro Science and or the total Community MTT University. Accordingly for a first instance the second Entity is Intro Science, and for a second instance the second Entity is MTT University.

With respect to table of values 516 and table of values 518, the Fields originating with the exemplary Discussion 300 are shown in bold so as to indicate how the Fields relate in the overall totals. Moreover, a User of Similarity Determining System 100 is provided with a visual indication of how Fields relate and can therefore assess the degree of similarity as between the exemplary Discussion 300 as it relates to the overall totals of the sub community for Intro Science and the overall totals of the community MTT University.

Of course, for the exemplary Discussion 400 shown in FIG. 4, the determination of similarity between the Users and illustrated Entities is somewhat already self evident as the Users are themselves actively engaging in the exemplary Discussion. The advantageous nature of the Similarity Determining System 100 and method 200 is more fully appreciated with respect to the determination of similarity with other Entities not directly party to the exemplary discussion 400, and/or perceiving other similarities with Entities beyond the context of discussion 400.

Figure 6:
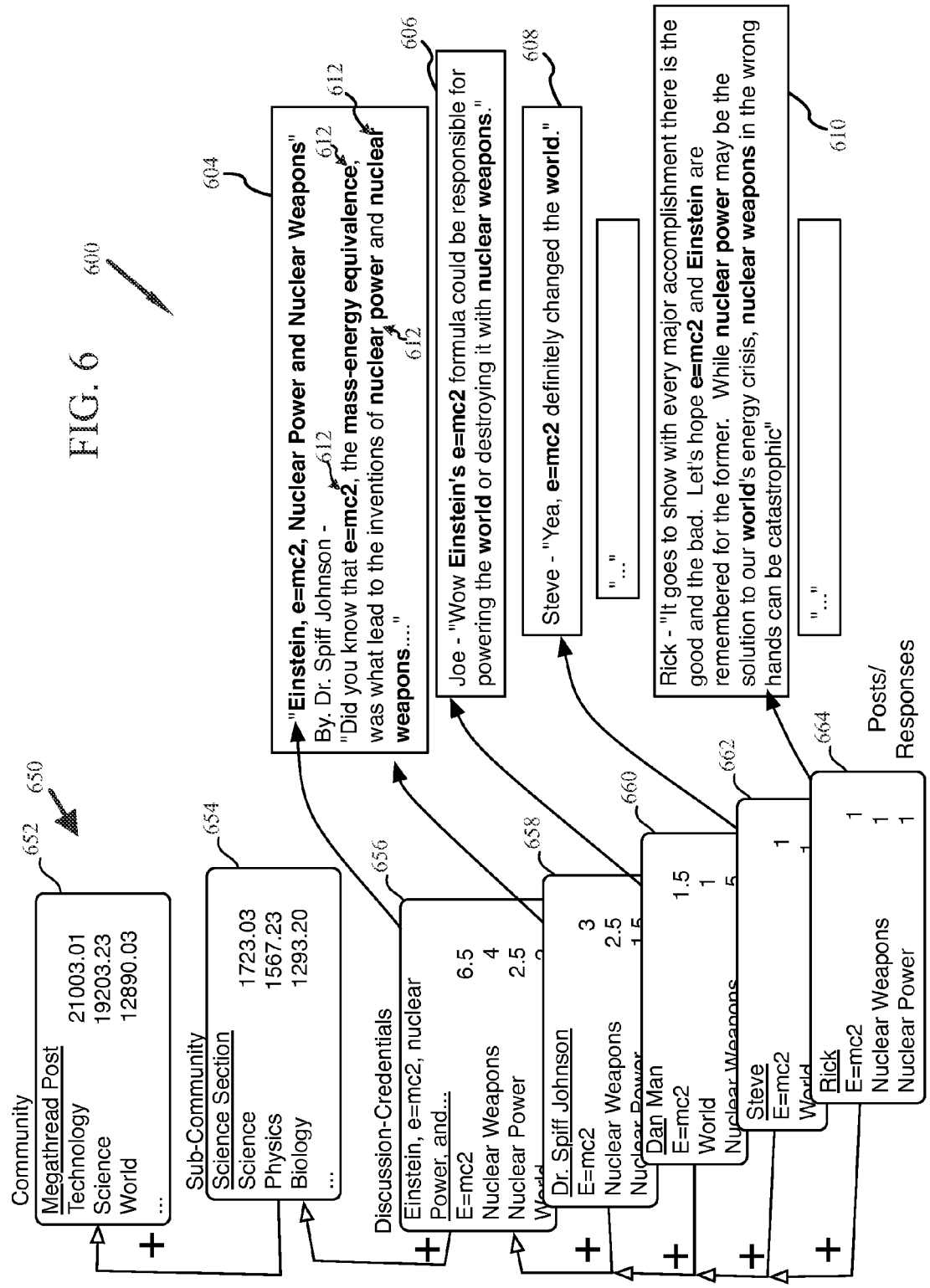
FIG. 6 is a conceptual illustration of a second Discussion on a Social Network involving multiple Entities participating in similarity determination in accordance with at least one embodiment.

FIG. 6 therefore conceptually illustrates at least a portion of different Discussion 600 that has evolved on a Social Network site. This Discussion 600 may have evolved on the same Social Network site 102 as Discussion 400 or a different Social Network site, i.e., Social Network site 112.

As with Discussion 400, in Discussion 600 there are a plurality of Users—Prof. Spiff Jones, who has commenced the discussion 602 regarding Einstein, e=mc², Nuclear Power and Nuclear Weapons, and provided an opening post 404, and Dan_Man, Steve and Rick who have each provided a response, 606, 608 and 610 respectively.

Whereas Discussion 400 was for the sake of example analyzed by the Similarity Determining System 100 in substantially real time, Discussion 600 is understood and appreciated to be analyzed by the Similarity Determining System 100 after occurring. Moreover, it is understood and appreciated that the Similarity Determining System 100 can be applied historically, which is to say to preexisting or archived discussions so as to identify Fields and area of Similarity between existing Entities.

In addition, Similarity Determining System 100 can evaluate a Discussion, such as Discussion 400 or Discussion 600 to provide values and still remain active to detect and account for subsequent responses by Users occurring after the initial evaluation for similarity has been performed. Moreover, Similarity Determining System 100 and method 200 are understood and appreciated to be ongoing systems and methods, operating to potentially rest at times, but able to account for new Entries/Responses when and as added.

Moreover, for historical review and analysis method 200 is applied substantially as described above, however the actions of monitoring for Entry/Response, block 206 becomes the action of stepping through each Entry/Response as they have already been provided and no waiting time is required. Similarly, invitations to become a registered User, decision 210, may be skipped.

To summarize, the method 200 as applied to Discussion 600 in FIG. 6 is implemented by establishing a Database of Fields collected, from a first Discussion on a first Social Network, the Discussion including a plurality of postings by at least one first User and at least one second User, the Fields associated with at least a first Entity. Method 200 continues by assigning a value to each Field, and evaluating the values of each Field to one another to establish a first Table providing a context of association between Fields to identify the First Entity has having a quantified level interests as identified by each Field, the values permitting a determination of similarity to at least one Second Entity querying for at least two Fields.

FIG. 6 also shows a conceptual illustration of the Field Collections for at least the Entities 650 of the Community—Megathread Post 652. The sub-community—Science Section 654, a discussion—Einstein, e=mc², Nuclear Power and Nuclear Weapons 656, and a collection of Users—Spiff Jones 658, Dan_Man 660, Steve 662 and Rick 664. The hierarchy of the Entities 650 is also shown.

As shown in Bold, at least the words, e=mc², mass-energy equivalence, nuclear power and nuclear weapons are identified as Fields 612 and associated with Spiff Jones. Likewise, Users Dan_Man, Steve and Rick each have associated Fields which are shown to have accumulated Field Values based on subsequent replies from other Users.

More specifically, it is appreciated from FIG. 6 that the Field Values developed with respect to each User's Entry/Response and shown for each User's Entry/Response Collection are accumulated for the Discussion 656. Likewise, additional Discussions that are not shown also have accumulated Field Values and are combined for the Field Values shown for the sub-community Science Section 654. And similarly, multiple sub-communities are combined for the Field Values of the overall Community Megathread Post 652.

FIG. 7 presents more clearly a plurality of different tables associating the Fields to different Entities. More specifically, table of records 700 shows the Field Values developed for each of the Users. As shown, there are entries for Field Values for Fields used by the User Spiff in column 702, Dan_Man in Column 704, Steve in column 706 and Rick in column 708.

In addition, table of records 710 shows the Field Values developed for the Entity defined as the discussion 656. Table of records 712 shows the Field Values developed for the Entity defined as the sub-community, Science Section 654, and table of records 714 shows the Field of Values developed for the Entity defined as the community Megathread Post 652.

In addition, table of records 716 shows the Field Values developed for sub-community Science Section 654 based on all discussions, and table of values 718 shows the Field Values developed for the total community Megathread Post 652 based on all discussions.

Fields and more specifically Field Values are cumulative, such that the Fields and Field Values earned by an Entity in one Discussion are aggregated with the Fields and Field Values earned by that same Entity with respect to other Discussions.

Figure 8:
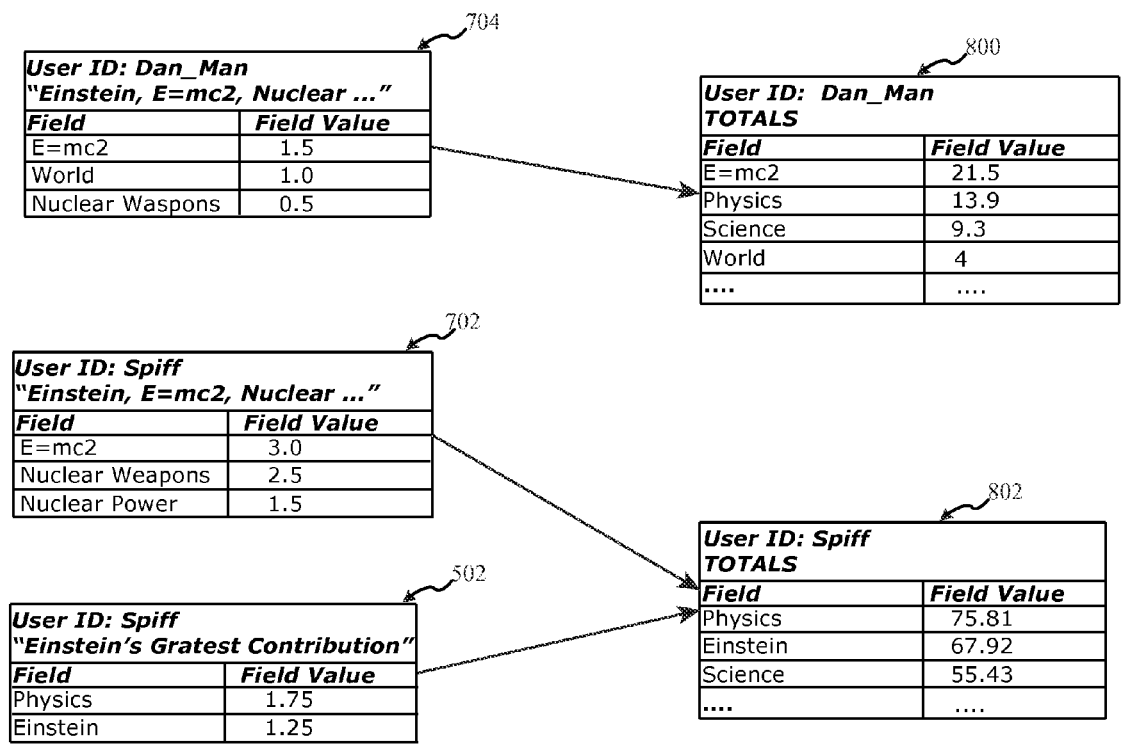
FIG. 8 illustrates the combination of tables for User Entities in accordance with at least one embodiment.

Moreover, as shown in FIG. 8, User Dan_Man has accumulated Field Values 704 from Discussion 700 which are aggregated with his other Fields from other Discussions not shown, to provide a total or global table 800 of associated Fields and values for User Dan_Man. Likewise User Spiff (having the aliases Dr. Spiff Jones and Prof. Spiff Jones) has accumulated Field Values 502 from Discussion 400 and Field Values 702 from Discussion 700 which in turn are aggregated with his other discussions to yield a total or global table 802 of associated Fields and Values for User Spiff.

Figure 9:
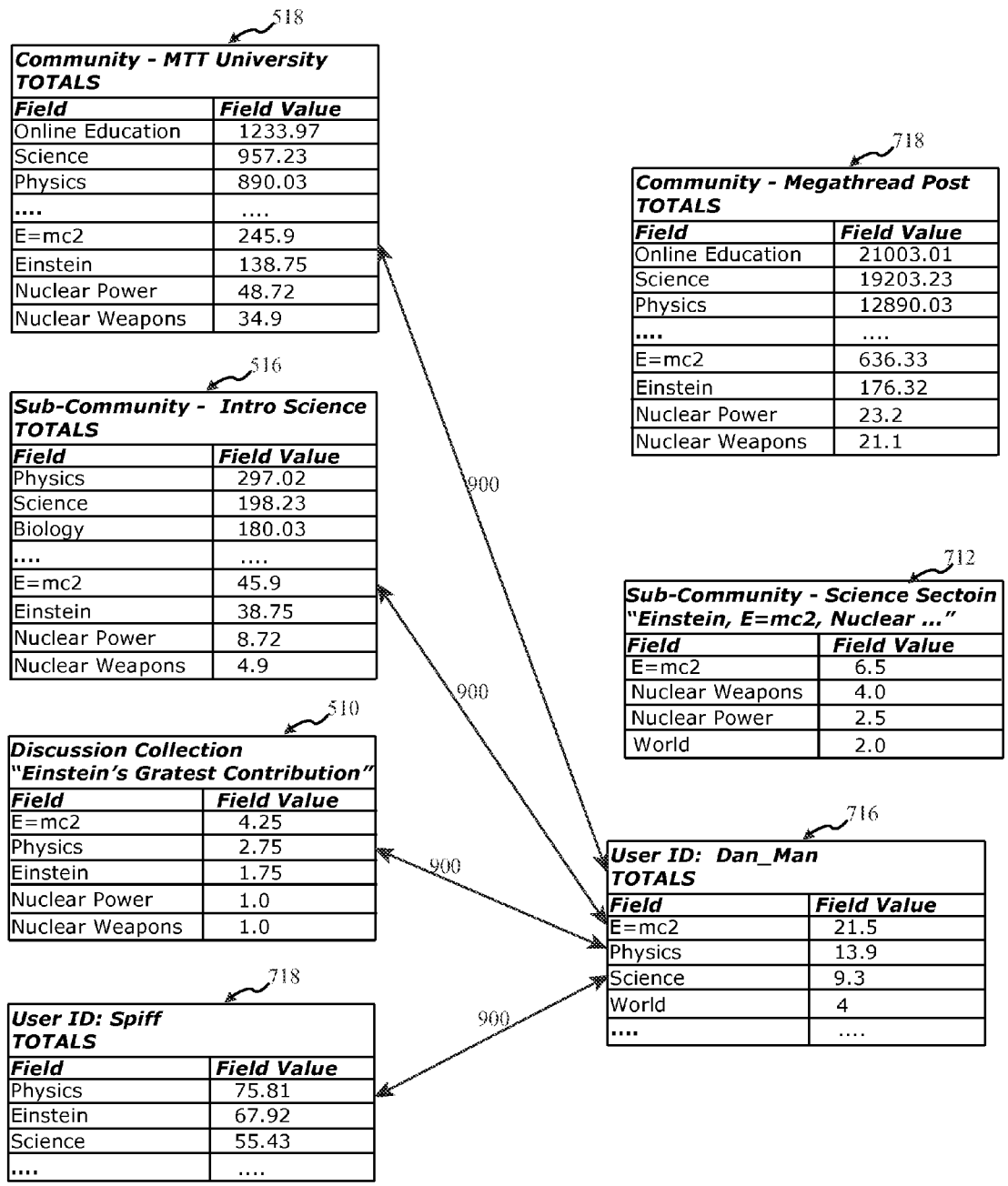
FIG. 9 illustrates the comparison of tables for different Entities associated with different Discussion in accordance with at least one embodiment.

Indeed, for at least one embodiment each Entity's global table is the table selected for similarity detection. For example, FIG. 9 illustrates several global tables duplicated from FIGS. 5, 7 and 8—those tables on the left corresponding to the Entities involved in Discussion 400, i.e., the community—MTT University 518, the sub-community—Intro science 516, the discussion—Einstein's Greatest Contribution 510 and User—Spiff 802. On the right are the global tables corresponding to Entities involved in Discussion 600, i.e., the community—Megathread Post 718, the discussion—Einstein, $e=mc^2$, Nuclear Power and Nuclear Weapons 712, and User Dan_Man 800.

As indicated by arrows 900 Similarity Determining System 100 is indicating several different connections of similarity. As shown, similarity between a first Entity and a Second Entity is determined at least in part by comparing the First Entity Table with the Second Entity Table so as to identify matching Fields as well as the relationships between those Fields. More specifically, User Dan_Man, who has a significant interest in the equation $e=mc^2$, Physics, and Science but who has never visited the first Social Network 102, is advantageously permitted by Similarity Determining System 100 to identify other Entities who share similar interests.

Again, as an Interest Group is defined as two or more associated Fields, similarity may be determined in at least one embodiment by specifically utilizing an Interest Group, defined either by the User, the Community or the Similarity Determining System 100.

With respect to the above descriptions regarding Discussions 400 and 600, it should also be understood and appreciated that for at least one embodiment Similarity Determining System 100 is operable to develop Fields and Field Values for multiple Entities about contemporaneously. Moreover, method 200 can be adapted to be applied generally simultaneously for both a first Entity and a second Entity.

To summarize for either Discussion 400 or Discussion 600, in at least one embodiment, Similarity Determining System 100 gathers metadata from at least one posting by a first User on a first Social Network 102 to define at least one first Field associated with at least one first Entity, each associated first Field having a value.

Similarity Determining System 100 continues with gathering metadata from at least one Third Party response to the posting by the first User to define at least one second Field associated with at least one second Entity, each associated second Field having a value.

The gathered metadata form the Third Party is response relating to the posting by the first User is evaluated to increment the value of at least one first Field as associated with the first Entity. Substantially the same action is performed for yet another Third Party response relating to the first Third Party response. An indication of the value of each first Field and each second Field associated with each first Entity and second Entity to indicate a value of similarity between each first Entity and second Entity.

With respect to the above description of similarity determination, it should be understood and appreciated that Similarity Determining System 100 advantageously permits even new Users to quickly identify other Entities with which he or she shares common interests (defined as Fields.) Indeed, for at least one embodiment, the Similarity Determining System 100 permits a User to manually enter at least two Fields directly for query without having a pre-established table of Fields and associated values. As such, a User wishing to identify Entities with useful information can be quickly identified with greater context then is generally permitted with a more free form web search.

It should also be understood and appreciated that as the method 200 of Authentication bridges the registered Users identity across multiple Social Networks, it is advantageously possible for an inquisitive party to learn of other discussions and or information upon other Social Networks that he or she may have been previously unaware of. For example, a person looking for information in caring for an elderly parent may discover a Social Network and support group that is entirely dedicated to that cause. Likewise, a universe of valuable information regarding nut allergies, ideas for safe birthday ideas for children, or other issues may be easily identified and accessed in ways that are not currently provided by traditional search engines.

Figure 10:
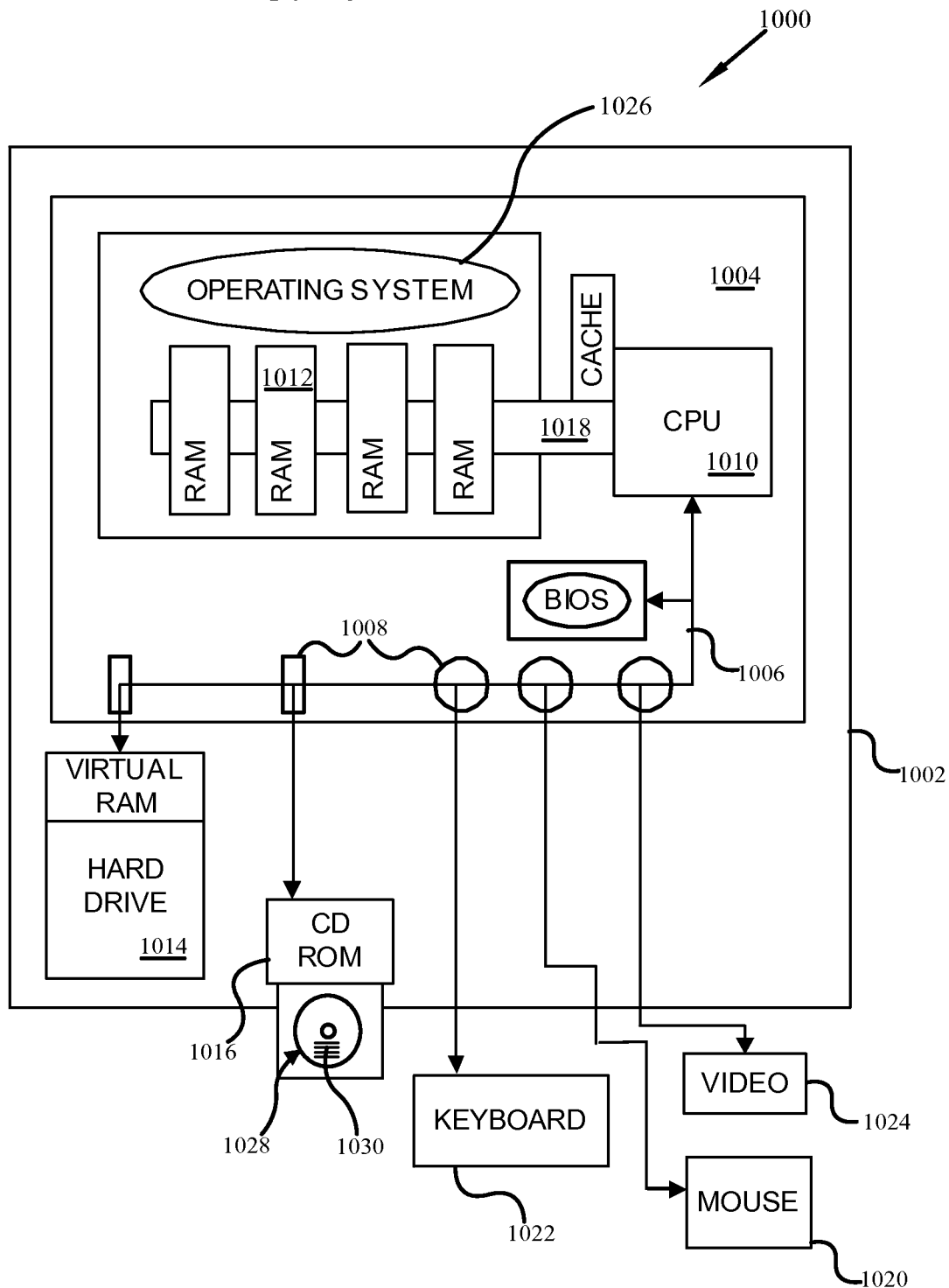
FIG. 10 is a block diagram of a computer system in accordance with certain embodiments of the present invention.

With respect to the above description of Similarity Determining System 100 and method 200 it is understood and appreciated that the method may be rendered in a variety of different forms of code and instruction as may be used for different computer systems and environments. To expand upon the initial suggestion of a computer implementation above, FIG. 10 is a high level block diagram of an exemplary computer system 1000. Computer system 1000 has a case 1002, enclosing a main board 1004. The main board 1004 has a system bus 1006, connection ports 1008, a processing unit, such as Central Processing Unit (CPU) 1010 with at least one macroprocessor (not shown) and a memory storage device, such as main memory 1012, hard drive 1014 and CD/DVD ROM drive 1016.

Memory bus 1018 couples main memory 1012 to the CPU 1010. A system bus 1006 couples the hard disc drive 1014, CD/DVD ROM drive 1016 and connection ports 1008 to the CPU 1010. Multiple input devices may be provided, such as, for example, a mouse 1020 and keyboard 1022. Multiple output devices may also be provided, such as, for example, a video monitor 1024 and a printer (not shown).

Computer system 1000 may be a commercially available system, such as a desktop workstation unit provided by IBM, Dell Computers, Gateway, Apple, or other computer system provider. Computer system 1000 may also be a networked computer system, wherein memory storage components such as hard drive 1014, additional CPUs 1010 and output devices such as printers are provided by physically separate computer systems commonly connected together in the network. Those skilled in the art will understand and appreciate that the physical composition of components and component interconnections are comprised by the computer system 1000, and select a computer system 1000 suitable for the establishing the Authentication System 100.

When computer system 1000 is activated, preferably an operating system 1026 will load into main memory 1012 as part of the boot strap startup sequence and ready the computer system 1000 for operation. At the simplest level, and in the most general sense, the tasks of an operating system fall into specific categories, such as, process management, device management (including application and User interface management) and memory management, for example. The form of the computer-readable medium 1028 and language of the program 1030 are understood to be appropriate for and functionally cooperate with the computer system 1000.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall there between.

What is claimed is:

1. A method to determine similarities between online Entities on at least one Social Network comprising:
    gathering metadata from at least one posting by a First User on a first Social Network to define at least one text First Field provided by the at least one First User and occurring in the at least one posting, the First Field associated with at least one First Entity, each associated First Field having an initial system generated value;
    defining an automated value to be automatically assigned to each associated text field upon subsequent use in a response by a third party;
    evaluating responses to the posting by at least one third party different from the first user, and in response to the third party using one or more of the associated first fields in the response, applying the automated value to aggregate the value of each associated first field used in the response; and
    providing an indication of the aggregated value of each associated first field associated with each first entity as developed by the subsequent use of the associated field in the evaluated third party postings, the indicated aggregated value permitting a determination of credibility for similarity to at least one second entity querying for similarity.

2. The method of claim 1, further including evaluating at least one non-textual response to postings by at least one third party and applying the automated value to at least partially aggregate the value of each used first field based on the at least one non-textual response.

3. The method of claim 1, wherein the First Entity is selected from the group consisting of, the First User, at least one Field, the Posting by the First User, the First Social Network, a Community, a Second Social Network, a First Discussion, a Second Discussion, an Interest.

4. The method of claim 1, wherein the degree of similarity is based on the existence of at least the queried Fields as well as how the existing Fields correlate to each other.

5. The method of claim 1, wherein providing an indication of the aggregated value of each first field includes evaluating the aggregated value of each field to one another to establish a table providing a context of association between fields to identify the first entity as having a quantified level of interest as identified by each Field.

6. The method of claim 5, wherein the context of association is determined by comparing the value of a first Field to the value of a second Field.

7. The method of claim 5, wherein the First Entity may range from a low order entity to a high order entity, the table of a high order entity including at least one table of a low order entity.

8. The method of claim 1, wherein at least a subset of associated First Fields are First Entities associated to other First Fields as Second Entities, the association between First Fields providing a context of association as between the associated Fields.

9. The method of claim 1, wherein the Second Entity is selected from the group consisting of, a Second User, at least one Field, a Posting by the Second User, the First Social Network, a Second Social Network, the First Discussion, a Second Discussion, an interest.

10. The method of claim 8, wherein the Second Entity has an established Table providing a context of associations between Fields to identify the Second Entity as having a quantified level of interest as identified by each Field.

11. The method of claim 10, wherein the Second Entity may range from a low order entity to a high order entity, the table of a high order entity including at least one table of a low order entity.

12. The method of claim 10, wherein the similarity between the First Entity and the Second Entity is determined by comparing associated tables.

13. The method of claim 1, wherein the method is performed substantially concurrently with the posting and responses.

14. The method of claim 1, wherein the method is applied historically to an existing Discussion having at least one posting by a First User and at least one reply by at least one Third Party.

15. The method of claim 1, further comprising:
    gathering metadata from at least one posting by the First User on a second Social Network, the posting including the at least one associated first field;
    evaluating responses to the posting by at least one third party different from the first user, and in response to the third party using one or more of the first fields, applying the automated value to the value of each first field used in the response; and
    providing an indication of the aggregated value of each first field associated with each first entity as developed by the subsequent use of the associated field in the evaluated third party postings, the indicated aggregated value permitting a determination of credibility for similarity to at least one second entity querying for similarity.

16. A method to determine similarities between online Entities on at least one Social Network comprising for each entity:
    establishing a Database of Fields collected from a First Discussion on a first Social Network, the Discussion including at least one posting by a first user providing at least one text first fields associated with at least a first entity, and a plurality of response posting by at least one second user;
    defining an automated value to be assigned to each associated field upon subsequent use in a response by a second user;
    evaluating second user responses to the posting by the first user, and in response to the second user using one or more of the first fields, applying the automated value to aggregate the value of each first field used in the response, wherein the second user is different from the first user; and
    evaluating the aggregated value of each first field to one another to establish a first table providing a context of association between first fields to identify the first entity as having a quantified level of interest as identified by each first field, the aggregated value permitting a determination of credibility for similarity to at least one Second Entity.

17. the method of claim 16, further including evaluating at least one non-textual response to postings by at least one third party and applying the automated value to at least partially aggregate the value of each used first field based on the at least one non-textual response.

18. The method of claim 16, wherein at least a subset of Fields are First Entities associated to other Fields as Second Entities, the association between First Fields providing a context of association as between the associated Fields.

19. The method of claim 16, wherein the First Entity is selected from the group consisting of, the First User, at least one Field, the Posting by the First User, the First Social Network, a Second Social Network, the First Discussion, a Second Discussion, an interest.

20. The method of claim 16, wherein the First Entity may range from a low order entity to a high order entity, the table of a high order entity including at least one table of a low order entity.

21. The method of claim 16, wherein the context of association is determined by comparing the value of a first Field to the value of a second Field.

22. The method of claim 16, wherein the Database establishes an association of Fields with at least a Second Entity.

23. The method of claim 22, wherein the Second Entity is selected from the group consisting of, the Second User, at least one Field, the Posting by the Second User, the First Social Network, a Second Social Network, the First Discussion, a Second Discussion, an interest.

24. The method of claim 22 wherein the Second Entity may range from a low order entity to a high order entity, the table of a high order entity including at least one table of a low order entity.

25. The method of claim 22 wherein the similarity between the First Entity and the Second Entity is determined by comparing associated tables.

26. The method of claim 22 wherein similarity to a Third Entity is determined by providing a Third Entity Table having at least two Fields, the Third Entity Table compared to at least the First Entity Table.

27. A computer system having at least one physical processor and memory adapted by software instructions for determining similarities between Entities comprising:
the processor adapted at least in part by the software as a Metadata Gatherer structured and arranged to gather metadata from at least one first Social Network regarding at least one User identity, the gathered metadata including at least one text Field obtained from at least one posting by the at least one user identity and subsequent third party responses to the at least one user identity;
a database in the memory structured and arranged to associate the at least one text field to at least one entity as an associated field, each text field having an initial system generated value; and
the processor adapted at least in part by the software as a value determiner structured and arranged to evaluate third party responses to the posting by the first user—the third party different from the first user, and in response to the third party using one or more of the text fields, applying a system generated automated value to aggregate the value of each text field used in the response and evaluating the aggregate aggregated value of each field to one another to establish a first table providing a context of association between fields to identify the first entity as having a quantified level of interest as identified by each field, the aggregated value permitting a determination of credibility for similarity to at least one second entity.

28. The system of claim 27, wherein the value determiner is further structured and arranged to determine the value for each field based at least in part on determining the number of responses by third parties, the number of times the at least one associated field is used in responses, and non-textual third party responses.

29. The system of claim 27, wherein determining the value for at least a portion of the metadata includes evaluating non-textual responses.

30. The system of claim 27, wherein the First Entity is selected from the group consisting of, the First User, at least one Field, the Posting by the First User, the First Social Network, a Community, a Second Social Network, a First Discussion, a Second Discussion, an Interest.

31. The system of claim 27, wherein at least a subset of Fields are First Entities associated to other Fields as Second Entities, the association between First Fields providing a context of association as between the associated Fields.

32. The system of claim 27, wherein the Second Entity is selected from the group consisting of, the Third Party, at least one Field, the Response by the Third Party, the First Social Network, a Community, a Second Social Network, a First Discussion, a Second Discussion, an Interest.

33. The system of claim 27, wherein each First Entity has an associated table of Fields and values and each Second Entity has an associated table of Fields and Values, similarity between Entities determined by comparing associated tables.

34. The system of claim 27, wherein the context of association is determined by comparing the value of a first Field to the value of a second Field.

35. A non-transitory machine readable medium on which is stored a computer program for determining similarities between Entities on at least one Social Network the computer program comprising instructions which when executed by a computer system having at least one processor performs the steps of:
gathering metadata from at least one posting by a First User on a first Social Network to define at least one text First field provided by the at least one first user and occurring in the at least one posting, the first field associated with at least one first entity, each associated first field having an initial system generated value;
defining an automated value to be assigned to each associated text field upon subsequent use in a response by a third party;
evaluating responses to the posting by at least one third party different from the first user, and in response to the third party using one or more of the associated first fields in the response, applying the automated value to aggregate the value of each associated first field used in the response; and
providing an indication of the aggregated value of each associated first field associated with each first entity as developed by the subsequent use of the associated field in the evaluated third party postings, the indicated aggregated value permitting a determination of credibility for similarity to at least one second entity querying for similarity.

36. the non-transitory machine readable medium of claim 35, further including evaluating at least one non-textual response to postings by at least one third party and applying the automated value to at least partially aggregate the value of each used first field based on the at least one non-textual response.

37. The non-transitory machine readable medium of claim 35, wherein the First Entity is selected from the group consisting of, the First User, at least one Field, the Posting by the First User, the First Social Network, a Community, a Second Social Network, a First Discussion, a Second Discussion, an Interest.

38. The non-transitory machine readable medium of claim 35, wherein the degree of similarity is based on the existence of at least the queried Fields as well as how the existing Fields correlate to each other.

39. The non-transitory machine readable medium of claim 35, wherein providing an indication of the aggregated value of each first field includes evaluating the aggregated value of each field to one another to establish a table providing a context of association between fields to identify the First Entity as having a quantified level of interest as identified by each Field.

40. The non-transitory machine readable medium of claim 39, wherein the context of association is determined by comparing the value of a first Field to the value of a second Field.

41. The non-transitory machine readable medium of claim 39, wherein at least a subset of Fields are First Entities associated to other Fields as Second Entities, the association between First Fields providing a context of association as between the associated Fields.

\* \* \* \* \*